(No Model.)

J. F. TIBBETS.
HARVESTER.

No. 286,505. Patented Oct. 9, 1883.

Witnesses.  John F. Tibbets Inventor.
By J. E. Bryan
his atty

UNITED STATES PATENT OFFICE.

JOHN F. TIBBETS, OF BARTON, KANSAS, ASSIGNOR TO THE McCORMICK HARVESTING MACHINE COMPANY, OF CHICAGO, ILLINOIS.

HARVESTER.

SPECIFICATION forming part of Letters Patent No. 286,505, dated October 9, 1883.

Application filed October 12, 1882. (No model.)

*To all whom it may concern:*

Be it known that I, JOHN F. TIBBETS, of Barton, in the county of Labette and State of Kansas, have invented a new and useful Improvement in Harvesting-Machines; and I do hereby declare that the following is a full, clear, and exact description of the same.

The object of my invention is to furnish a device adapted to be attached to any mowing or reaping machine for the purpose of preventing the main wheel from sinking or miring in soft ground or mud.

My invention consists in a mud-shoe or broad runner, constructed and applied to the machine as hereinafter described, and clearly pointed out in the claims.

Figure 1:
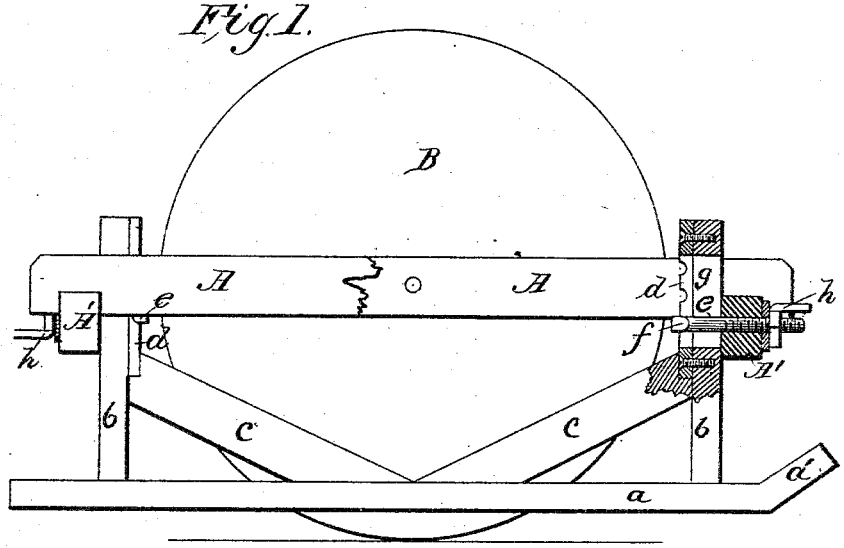
Figure 2:
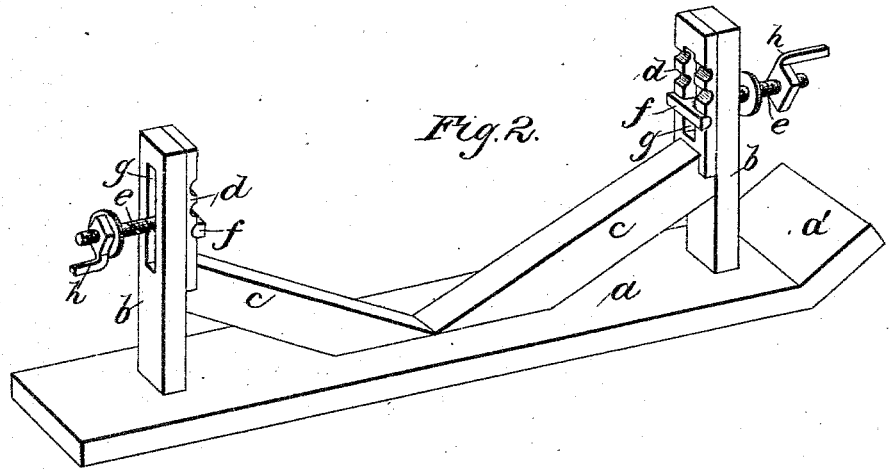

In the accompanying drawings, forming part of this specification, Figure 1 is a side elevation of my invention attached to a harvester-frame, and Fig. 2 is a perspective view of the same, detached.

A A' represent the frame-work, and B the main supporting-wheel, of a reaper or mower to which my improvement is applied.

$a$ is the mud shoe or runner, consisting of a broad plank turned up at the front end like a sled-runner, as shown at $a'$.

$b\ b$ are upright posts, secured to said shoe, and braced to the same by the pieces $c\ c$. These posts are slotted at $g\ g$, for the passage of the fastening-bolts $e\ e$.

$d\ d$ are notched castings, secured to said posts, and having slots corresponding to the slots $g\ g$.

$e\ e$ are the fastening-bolts, having T-shaped heads $f\ f$, adapted to engage with the notches in the castings $d\ d$, and threaded at their other ends for the reception of the screw-nuts $h\ h$.

The shoe or runner is placed below the frame A A' by the side of the wheel B and three or more inches above the bottom of the said wheel. The posts $b\ b$ are thus adjacent to the cross-girt A' of the frame. The bolts $e\ e$ are passed through said girts and through the slots in the posts and castings, the T-shaped head $f$ of each bolt engaging one of the notches in the casting $d$. The nuts $h\ h$ are then turned to firmly clamp the posts $b\ b$ to the frame, and thus secure the shoe in place. When the main wheel sinks into soft ground, the broad shoe comes in contact with the surface of the ground, acts as a support for the machine, and prevents the further sinking of the wheel. The wheel projecting below the shoe has sufficient contact with the ground to give it the necessary tractive power, while the shoe prevents its sinking so deep as to clog the machine or stop its operation. When it is desired to adjust the height of the shoe to regulate the depth to which the main wheel may sink, the nuts are loosened, the heads of the bolts placed in a higher or lower notch, and the nuts again tightened. This adjustment does not necessitate the removal of the bolts or the entire detachment of the shoe from the frame.

Having described my invention, what I claim is—

1. In a mower or reaper, the frame A A' and wheel B, in combination with the shoe or runner $a$, having the posts $b\ b$, and fastenings for attaching the same to said frame, substantially as and for the purposes set forth.

2. The combination of the main frame, the shoe having the posts $b\ b$, provided with the slots $g\ g$, the notched castings $d\ d$, and the T-headed fastening-bolts $e\ e$, substantially as and for the purposes set forth.

JOHN F. TIBBETS.

Witnesses:
E. W. MINTURN,
D. T. McCOY.